United States Patent
Lee

(10) Patent No.: US 9,622,074 B2
(45) Date of Patent: Apr. 11, 2017

(54) METHOD FOR CONTINUING OPERATION ON MOBILE ELECTRONIC DEVICE, MOBILE DEVICE USING THE SAME, WEARABLE DEVICE USING THE SAME, AND COMPUTER READABLE MEDIUM

(71) Applicant: HTC Corporation, Taoyuan County (TW)

(72) Inventor: Yu-Cheng Lee, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 60 days.

(21) Appl. No.: 14/328,731

(22) Filed: Jul. 11, 2014

(65) Prior Publication Data

US 2015/0031348 A1 Jan. 29, 2015

Related U.S. Application Data

(60) Provisional application No. 61/857,707, filed on Jul. 24, 2013, provisional application No. 61/907,399, filed on Nov. 22, 2013.

(51) Int. Cl.
*H04M 1/725* (2006.01)
*H04W 12/02* (2009.01)
(Continued)

(52) U.S. Cl.
CPC ............ *H04W 12/02* (2013.01); *H04B 1/385* (2013.01); *H04M 1/7253* (2013.01);
(Continued)

(58) Field of Classification Search
CPC ... H04W 12/02; H04W 12/06; H04M 1/7253; H04M 2250/12; H04M 1/72519; H04B 1/385; H04B 2001/3861
See application file for complete search history.

(56) References Cited

U.S. PATENT DOCUMENTS

2002/0115478 A1* 8/2002 Fujisawa ............. H04M 1/6505
455/567
2006/0256074 A1* 11/2006 Krum .................... G06F 1/1626
345/156
(Continued)

FOREIGN PATENT DOCUMENTS

| CN | 102473024 | 5/2012 |
|---|---|---|
| CN | 102904618 | 1/2013 |
| TW | 201015287 | 4/2010 |

OTHER PUBLICATIONS

"Office Action of Taiwan Counterpart Application", issued on Jun. 1, 2016, p. 1-p. 6.
(Continued)

*Primary Examiner* — Nathan Mitchell
(74) *Attorney, Agent, or Firm* — Jianq Chyun IP Office

(57) ABSTRACT

The present disclosure provides a method, a mobile electronic device, a wearable electronic device and a computer readable medium for continuing an operation initiated on the wearable electronic device on the mobile electronic device based on motion coherence between movements of the mobile electronic device and a wearable electronic device without providing an input. In the disclosure, an operation would be initiated on the wearable electronic device. The wearable electronic device would transmit an application data associated with the operation initiated on the wearable electronic device to the mobile electronic device. Then, an application program associated with the operation would be automatically launched on the mobile electronic device to continue the operation initiated on the wearable electronic device according to the application data in response to a motion coherence of the mobile electronic device and the wearable electronic device.

30 Claims, 6 Drawing Sheets

(51) Int. Cl.
*H04B 1/3827* (2015.01)
*H04W 12/06* (2009.01)

(52) U.S. Cl.
CPC . *H04B 2001/3861* (2013.01); *H04M 1/72519* (2013.01); *H04M 2250/12* (2013.01); *H04W 12/06* (2013.01)

(56) References Cited

U.S. PATENT DOCUMENTS

| | | | |
|---|---|---|---|
| 2008/0070612 A1 | 3/2008 | Weinans | |
| 2012/0194976 A1 | 8/2012 | Golko et al. | |
| 2014/0101755 A1* | 4/2014 | Tang | G06F 21/35 726/20 |
| 2014/0273849 A1* | 9/2014 | Lee | G06F 3/017 455/41.2 |
| 2014/0350883 A1* | 11/2014 | Carter | A61B 5/6802 702/141 |
| 2015/0065893 A1* | 3/2015 | Ye | A61B 5/6898 600/483 |
| 2015/0161374 A1* | 6/2015 | Kim | G06F 1/1694 726/19 |
| 2015/0215770 A1* | 7/2015 | Chan | H04W 12/04 455/456.1 |
| 2015/0234473 A1* | 8/2015 | Wang | G06F 3/017 345/156 |
| 2015/0286813 A1* | 10/2015 | Jakobsson | G06F 21/35 726/9 |

OTHER PUBLICATIONS

"Office Action of China Counterpart Application", issued on Jan. 5, 2017, pp. 1-7, in which the listed references were cited.

\* cited by examiner

METHOD FOR CONTINUING OPERATION ON MOBILE ELECTRONIC DEVICE, MOBILE DEVICE USING THE SAME, WEARABLE DEVICE USING THE SAME, AND COMPUTER READABLE MEDIUM

CROSS REFERENCE TO RELATED APPLICATION

This application claims the priority benefit of U.S.A. provisional application Ser. No. 61/857,707, filed on Jul. 24, 2013, and U.S.A. provisional application Ser. No. 61/907,399, filed on Nov. 22, 2013. The entirety of the above-mentioned patent application is hereby incorporated by reference herein and made a part of specification.

TECHNICAL FIELD

The present disclosure is related to a method for continuing an operation on a mobile electronic device, a mobile electronic device using the same, a wearable electronic device using the same, and computer readable medium.

BACKGROUND OF THE DISCLOSURE

In recent years, small wearable electronic devices capable of being worn by an individual have been developed to assist the individual in their daily lives. Many of the small electronic devices are designed to wirelessly connect to a mobile electronic device such as a smart phone, a tablet computer, a personal digital assistant (PDA) and the likes, and information may be exchanged between the small wearable electronic device and the mobile electronic device. For example, when the mobile electronic device receives notification such as a text message, a call, or the likes, notification may be forwarded to the small wearable electronic device, so that the individual may be informed through the small wearable electronic device. Furthermore, some simple functions may be performed on the small wearable electronic device. However, these functions that are implemented to the small wearable electronic device are very limited due to its small size. For example, it might be comfortable for the individual to make selections through a touch screen of the small wearable electronic device by tapping the touch screen. However, with a small screen area of the small wearable electronic device, text insertion or large of information viewing may be not feasible.

Therefore, there is a need to further expand the functionality of the small wearable electronic, so that the small wearable electronic device is not limited to its small display size.

SUMMARY OF THE DISCLOSURE

The present disclosure proposes a method, electronic devices and a computer readable medium for operating the electronic device.

In the present disclosure, a method for operating a mobile electronic device is provided. The method for operating a mobile electronic device would include at least, but not limited to, initiating an operation on the wearable electronic device and transmitting, from the wearable electronic device to the mobile electronic device, an application data associated with the operation initiated on the wearable electronic device, wherein an application program associated with the operation is automatically launched on the mobile electronic device to continue the operation initiated on the wearable electronic device according to the application data in response to a motion coherence of the mobile electronic device and the wearable electronic device.

In the present disclosure, a wearable electronic device is provided. The wearable electronic device would include at least, but not limited to, a transceiver, an input device, and a processor. The input device is configured to receive a user input to initiate an operation. The processor is, configured to transmit an application data associated with the operation, though the transceiver, to a mobile electronic device, wherein an application program associated with the operation is automatically launched on a mobile electronic device to continue the operation initiated on the wearable electronic device according to the application data in response to a motion coherence of the mobile electronic device and the wearable electronic device.

In the present disclosure a non-transitory computer readable medium storing programs to be loaded into a mobile electronic device is provided to perform at least, but not limited to, steps of initiating an operation on a wearable electronic device and transmitting, from the wearable electronic device to a mobile electronic device, an application data associated with the operation initiated on the wearable electronic device, wherein an application program associated with the operation is automatically launched on the mobile electronic device to continue the operation initiated on the wearable electronic device according to the application data in response to a motion coherence of the mobile electronic device and the wearable electronic device.

In the present disclosure, a method for continuing the operation on a mobile electronic device is provided. In one of the exemplary embodiments, the method includes at least, but not limited to, receiving, through a transceiver, an application data associated with an application program installed on the mobile electronic device, and automatically launching the application program associated with the application data to continue the operation of the application program on the a mobile electronic device based on the application data when the mobile electronic device is unlocked.

In the present disclosure, the mobile electronic device including at least, but not limited to, a transceiver and a processor is provided. In one of the exemplary embodiments of the disclosure, the transceiver is configured to receive an application data associated with an application program installed on the mobile electronic device. The processor is configured to automatically launch the application program associated with the application data to continue an operation of the application program on the mobile electronic device based on the application data when the mobile electronic device is unlocked.

In the present disclosure a non-transitory computer readable medium storing programs to be loaded into a mobile electronic device is provided to perform at least, but not limited to, steps of receiving, through a transceiver, an application data associated with an application program installed on the mobile electronic device, and automatically launching the application program associated with the application data to continue the operation of the application program on the a mobile electronic device based on the application data when the mobile electronic device is unlocked.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
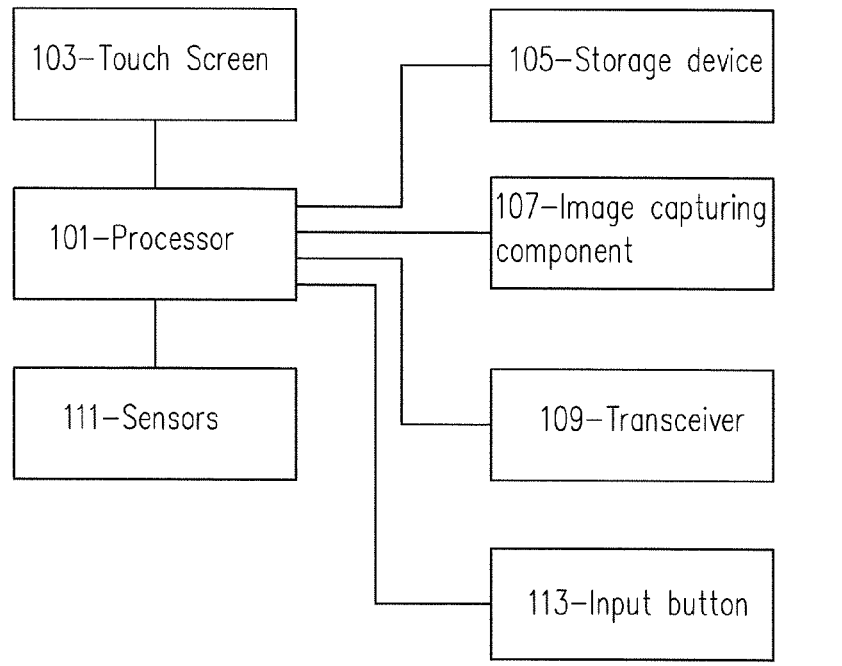
FIG. 1 is a block diagram illustrating hardware of a mobile electronic device in term of functional blocks according to one of the exemplary embodiments of the disclosure.

To make the above features and advantages of the application more comprehensible, several embodiments accompanied with drawings are described in detail as follows.

DETAILED DESCRIPTION OF DISCLOSED EMBODIMENTS

Reference will now be made in detail to the present embodiments of the disclosure, examples of which are illustrated in the accompanying drawings. Wherever possible, the same reference numbers are used in the drawings and the description to refer to the same or like parts.

In the exemplary embodiments of the disclosure, a wearable electronic device could refer to an electronic device being worn by an individual. For example, the wearable electronic device could be worn around a finger of the individual or fastened around a wrist of the individual. Although, the wearable electronic device illustrated in various exemplary embodiments hereafter are geared toward a wrist-band type electronic device, the same various exemplary embodiments may also be implemented by a ring-type electronic device designed to be worn around on a finger of an individual. It should be noted that the disclosure is not intended to limit the disposition and the shape of the wearable electronic device.

To identify an individual and ensure that an individual is authorized to operate a mobile electronic device, the disclosure provides security to verify an identity of an individual and yet reducing the steps the individual would take for operating the mobile electronic device. In the disclosure, a biometric signature unique to an individual could be obtained to identify the individual who wears a wearable electronic device. When the biometric signature obtained on the writable electronic is consistent with a stored biometric signature, the individual corresponding to the biometric signature would be authorized to operate the mobile electronic device based on motion coherence between the mobile electronic device and a wearable electronic device without providing an input such as touch operations to unlock the screen or to launch an application program. Operations of the mobile electronic device may be performed, automatically, based on the motion coherence between the mobile electronic device and the wearable electronic device.

In the disclosure, the wearable electronic device would display a plurality of icons on a touch screen of the wearable electronic device, which each of the icons are associated with an application program installed in the mobile electronic device. In one of the exemplary embodiments of the disclosure, an operation may be initiated by an individual on the wearable electronic device by selecting any one of the icons displayed on the touch screen of the wearable electronic device. Then, at any time, the individual may continue the operation initiated on the wearable electronic device on the mobile electronic device by simply pick up the mobile electronic device with a hand corresponding to an arm wearing the wearable electronic device.

FIG. 1 is a block diagram illustrating hardware of a mobile electronic device 100 in term of functional blocks according to one of the exemplary embodiment of the disclosure.

With reference to FIG. 1, the mobile electronic device 100 may be a smart phone, a mobile phone, a tablet computer, a personal digital assistant (PDA) and so forth. In the exemplary embodiment, the mobile electronic device 100 would include at least, but not limited to, a processor 101, a touch screen 103, a storage device 105, an image capturing device 107, a transceiver 109, a plurality of sensors 111, and an input button 113. Each components of the mobile electronic device 100 would be explained in details below.

The processor 110 may be, but not limited to, a central processing unit (CPU), or a programmable microprocessor, a digital signal processor (DSP), a programmable controller, an application specific integrated circuit (ASIC), a programmable logic device (PLD) or other similar devices or a combination thereof utilized for general or specific application. In the present embodiment, the processor 101 may be electrically coupled to the touch screen 103, the storage medium 105, the image capturing device 107, the transceiver 109, and each of the sensors 111, respectively, where the processor 101 would control all of the operations of the exemplary electronic device 100.

The touch screen 103 may be a display device integrated with touch detecting components, which could simultaneously provide a display function and an input function within a display area of the mobile electronic device 100. The display device may be, but not limited to, a liquid crystal display (LCD), a light-emitting diode (LED), a field emission display (FED), or other displays. The touch detecting components are disposed in the display device and arranged in rows and columns, which are configured to detect a touch event. The touch event may include events generated by touching the touch screen 103 with a finger, a palm, body parts or other objects. The touch detecting components may be, but not limited to, a resistive, a capacitive an optical or other types of touch sensing devices which would be integrated as a part of the touch screen 103.

The storage medium 105 may be volatile or nonvolatile memory storing buffered or permanent data such as data corresponding to a movement of the mobile electronic device, a biometric signature, media content such as image, application programs or instructions used to execute operations of the mobile electronic device 100.

The image capturing device 107 may be, but not limited to, a camera, video camera, or the likes which captures scenes through an optical component and an image pickup component as images such as photo, video, and the likes.

The transceiver 109 may be, but not limited to, components such as a protocol unit which supports signal transmissions of a global system for mobile communication (GSM), a personal handy-phone system (PHS), a code division multiple access (CDMA) system, a wideband code division multiple access (WCDMA) system, a long term evolution (LTE) system, or a worldwide interoperability for microwave access (WiMAX) system. The transceiver 109 may also be, but not limited to, components which support signal transmissions of a wireless fidelity (Wi-Fi) system, a Bluetooth (BT) system, or a near field communication (NFC) system. The transceiver 190 would provide wireless transmission for the mobile electronic device 100 including components, but not limited to, a transmitter circuit, a receiver circuit, an analog-to-digital (A/D) converter, a digital-to-analog (D/A) converter, a low noise amplifier (LNA), Mixers, filters, matching networks, transmission lines, a power amplifier (PA), and one or more antenna units. The transmitter and the receiver transmit downlink signals and receive uplink signals wirelessly. The receiver may include functional elements to perform operations such as low noise amplifying, impedance matching, frequency mixing, up frequency conversion, filtering, power amplifying, and so forth. The analog-to-digital (A/D) or the digital-to-analog (D/A) converter is configured to convert from an analog signal format to a digital signal form during uplink signal processing and from a digital signal format to an analog signal format during downlink signal processing. In the exemplary embodiment of the disclosure, the transceiver 109 may be utilized to wirelessly transmit or receive the data to or from other electronic devices.

The plurality of sensors 111 may include, but not limited to, a motion sensor and a proximity sensor. In the exemplary embodiment, the motion sensor is configured to detect a movement of the mobile electronic device 100 moving in a direction. The motion sensor would output a motion signal representing the linear movement and the direction corresponding to the movement. In the exemplary embodiment, the motion sensor may be implemented by, but not limited to, a g-sensor such as a g-sensor (e.g., an accelerometer) or a gyroscope sensor (or a gyro-sensor). For example, a three axis accelerometer would output an acceleration corresponding to each axis in response to the movement of the mobile electronic device, so that the linear movement of the mobile electronic device 100 may be obtained.

In one of the exemplary embodiments of the disclosure, the motion sensor is further configured to sense a rotational movement in space (e.g., pitch, roll, and yaw), which may be implemented by, but not limited to, a g-sensor in conjunction with an electric compass, or a gyroscope. The motion sensor would detect a rotational movement of the mobile electronic device 100 rotating about a particular axis in space and output a motion data representing the rotational movement (e.g, rotational angular velocity or rotational angle). It should be noted that the exemplary embodiments are not intended to limit the implementation of the motion sensor. The motion sensor may be implemented by any sensors or combinations of sensors that detects the liner movement, the direction of the linear movement, or the rotational movement of the mobile electronic device 100.

The proximity sensor of the mobile electronic device 100 is configured to sense a presence of a nearby object or approaching of the nearby object without contact. The type of the proximity sensor may include, but not limited to, inductive, capacitive, photoelectric, microwave sensors, etc. In the exemplary embodiment, the proximity sensor is configured to sense the presence of the object and then output a signal corresponding to the presence of the object.

The input button 113 of the mobile electronic device 100 may be a physical switch configured to turn on or turn off the mobile electronic device 100, adjust volumes of a speaker (not shown), etc.

Figure 2:
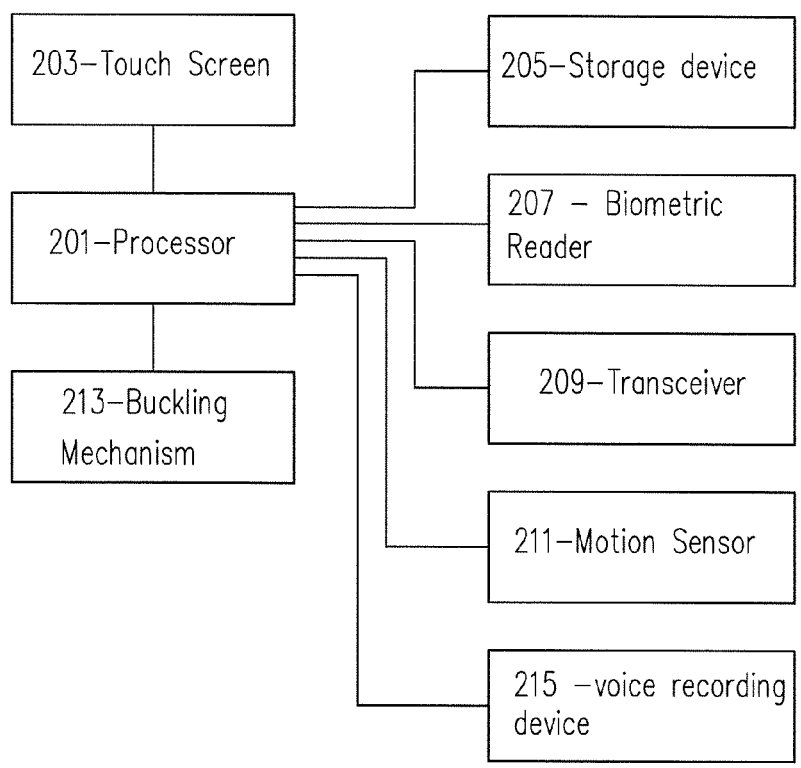
FIG. 2 is a block diagram illustrating hardware of a wearable electronic device in term of functional blocks according to one of the exemplary embodiment of the disclosure.

FIG. 2 is a block diagram illustrating hardware of a wearable electronic device 200 in term of functional blocks according to one of the exemplary embodiments of the disclosure.

With reference to FIG. 2, the wearable electronic device 200 may be a wrist-band type electronic device which could be worn around an individual's wrist. In the exemplary embodiment, the wearable electronic device 200 would include at least, but not limited to, a processor 201, a touch screen 203, a storage device 205, a biometric reader 207, a transceiver 209, a motion sensor 211, a buckling mechanism 213, and a voice recording device 215. Each components of the wearable electronic device 200 would be explained in details below.

The processor 201 may be, but not limited to, a central processing unit (CPU), or a programmable microprocessor, a digital signal processor (DSP), a programmable controller, an application specific integrated circuit (ASIC), a programmable logic device (PLD) or other similar devices or a combination thereof utilized for general or specific application. In the present embodiment, the processor 201 may be electrically coupled to the touch screen 203, the storage medium 205, the biometric reader 207 and the transceiver 209, respectively, where the processor 201 would control all of the operations of the wearable electronic device 200.

The touch screen 203 may be a display device integrated with touch detecting components, which could simultaneously provide a display function and an input function within a display area of the wearable electronic device 200. The display device may be, but not limited to, a liquid crystal display (LCD), a light-emitting diode (LED), a field emission display (FED), or other displays. The touch detecting components are disposed in the display device and arranged in rows and columns, which are configured to detect a touch event. The touch event may include events generated by touching the touch screen 203 with a finger, a palm, body parts or other objects. The touch detecting components may be, but not limited to, a resistive, a capacitive, and a photoelectric or other types of touch sensing devices which would be integrated as a part of the touch screen 203.

The storage medium 205 may be volatile or nonvolatile memory storing buffered or permanent data such as data corresponding to a movement of the wearable electronic device, a biometric signature, a user profile or instructions used to execute operations of the wearable electronic device 200.

The biometric reader 207 may be, but not limited to, an electrocardiography (ECG) detector, a finger print scanner, a microphone recording sound, etc. The biometric reader 207 is configured to obtain a biometric signature that is unique to an individual. In the exemplary embodiment, the ECG detector is utilized for detecting a characteristic of heartbeat of an individual who wears the wearable electronic device 200. However, the disclosure is not limited thereto. In other exemplary embodiments of the disclosure, the biometric signature may be a finger print of the individual, a characteristic of the individual's voice, and the likes.

The transceiver 209 may be, but not limited to, components such as a protocol unit which supports signal transmissions of a wireless fidelity (Wi-Fi) system, Bluetooth (BT) system, a near field communication (NFC) system, or a radio frequency identification (RFID) system. The transceiver 209 would provide wireless transmission for the wearable electronic device 200 including components, but not limited to, a transmitter circuit, a receiver circuit, an analog-to-digital (A/D) converter, a digital-to-analog (D/A) converter, a low noise amplifier (LNA), Mixers, filters, matching networks, transmission lines, a power amplifier (PA), and one or more antenna units. The transmitter and the receiver transmit downlink signals and receive uplink signals wirelessly. The receiver may include functional elements to perform operations such as low noise amplifying, impedance matching, frequency mixing, up frequency conversion, filtering, power amplifying, and so forth. The analog-to-digital (A/D) or the digital-to-analog (D/A) converter is configured to convert from an analog signal format to a digital signal form during uplink signal processing and from a digital signal format to an analog signal format during downlink signal processing. In the exemplary embodiment of the disclosure, the transceiver 209 may be utilized to wirelessly transmit or receive the data to or from other electronic devices.

The motion sensor 211 would include, but not limited to, a g-sensor such as an accelerometer or a gyroscope sensor (or a gyro-sensor). In the exemplary embodiment, the motion sensor 211 is configured to detect a linear movement of the wearable electronic device 200 moving in a direction. The motion sensor would output a motion signal representing the linear movement of the wearable electronic device 200 and the direction corresponding to the movement. For example, a three axis accelerometer would output an acceleration corresponding to an axis in response to the movement of the mobile electronic device, so that the linear movement of the mobile electronic device 200 may be obtained.

In one of the exemplary embodiments of the disclosure, the motion sensor is further configured to sense a rotational movement in space (e.g., pitch, roll, and yaw), which may be implemented by, but not limited to, a g-sensor in conjunction with an electric compass, or a gyroscope. The motion sensor would detect a rotational movement of the wearable electronic device 200 rotating about a particular axis in space and output a motion data representing the rotational movement (e.g., rotational angular velocity or angle). It should be noted that the exemplary embodiments are not intended to limit the implementation of the motion sensor 211 of the wearable electronic device 200. The motion sensor 211 may be implemented by any sensors or combinations of sensors that detects the liner movement, the direction of the linear movement, or the rotational movement of the wearable electronic device 200.

The buckling mechanism 213 may be configured to buckle one end of the wearable electronic device 200 to another end of the wearable electronic device 200 so that the wearable electronic device 200 is fastened around individual's wrist. In one of the exemplary embodiments, the buckling mechanism 213 may include, but not limited to, a microUSB connector which is configured to detect whether two ends of the wearable electronic device 200 are buckled together. It should be noted that the exemplary embodiment is not intended to limit the type of the connector being utilized for the buckling mechanism 213. In one of exemplary embodiments, sensory devices (e.g., a proximity sensor) may be utilized to detect whether two ends of the wearable electronic device 200 are buckled together. In addition to the microUSB connector, the buckling mechanism 213 also includes a mechanical mean to buckle both ends of the wearable electronic device 200 in a mechanical fashion, so that the wearable electronic device 200 would be securely fastened around individual's wrist. The disclosure is not intended to limit the mechanical mean of the buckling mechanism 213, the mechanical mean may be implemented by any means that securely buckles both ends of the wearable electronic device 200 together.

When two ends of the wearable electronic device 200 are not buckled together, such as when the user takes off the wearable electronic device 200 from the wrist, the buckling mechanism 213 is considered to be open. The microUSB connector may be configured to connect to a personal electronic device (e.g., a computer, a laptop, etc.) for data transmission or power charge when the buckling mechanism 213 is open. On the other hand, when the buckling mechanism 213 is buckled and securely fastened around the individual, the wearable electronic device 200 may obtain a biometric signature (e.g., ECG) that is unique to the individual as a security check through the biometric reader 205 of the wearable electronic device 200.

The voice recording device 215 may be a microphone and the likes. The voice recording device 215 is configured to obtain individual's voice and convert the voice into electrical signal.

Figure 3:
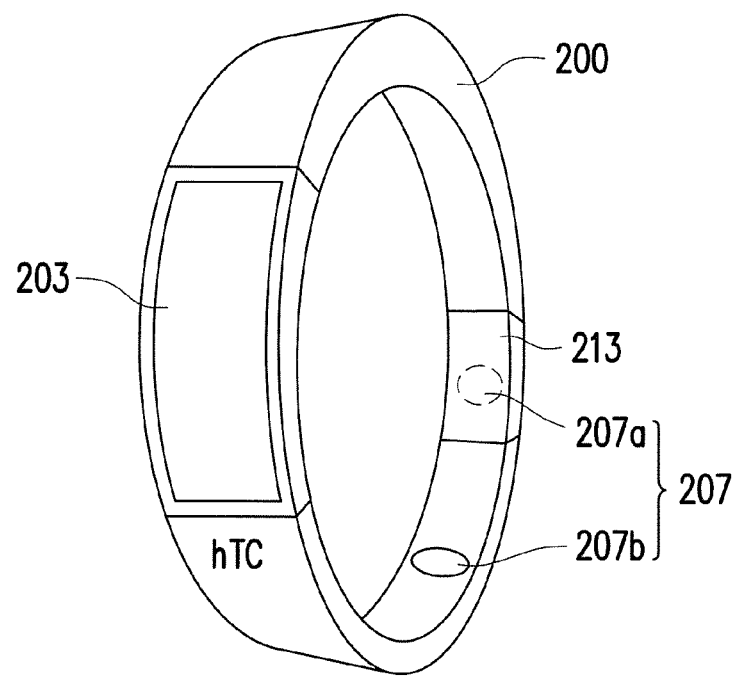
FIG. 3 is a conceptual diagram illustrating the wearable electronic device according to one of the exemplary embodiments of the disclosure.

FIG. 3 is a conceptual diagram illustrating the wearable electronic device 200 according to one of the exemplary embodiments of the disclosure. In the exemplary embodiment illustrated in FIG. 3, the biometric reader 207 is an ECG detector having a first ECG electrode 207a and a second ECG electrode 207b, which are respectively disposed on two opposite surfaces of the wearable electronic device 200. The first ECG electrode 207a is disposed on an outer surface of the wearable electronic device 200, which faces toward a direction away from the center of the wearable electronic device 200, and the second ECG electrodes 207b is disposed on an inner surface of the wearable electronic device 200, which faces toward the center of the writable electronic device 200. The first ECG electrodes 207a and the second ECG electrodes 207b of the ECG detector are configured to detect electrical impulses generated by cardiac activities of a heart of an individual who wears the wearable electronic device 200 and translate into an ECG data.

It should be noted that the disposition of the ECG detector is not limited to the exemplary embodiment illustrated in FIG. 3. In one of the exemplary embodiments, the first ECG electrodes 207a and the second ECG electrodes 207b may be disposed on two opposite surfaces of the buckling mechanism 213 of the wearable electronic device 200. For example, the first ECG electrodes 207a may be disposed on the outer surface of the buckling mechanism 213, and the second ECG electrodes 207b of the ECG detector may be disposed on the outer surface of the buckling mechanism 213. In the exemplary embodiment, ECG information of the individual may be obtained while the wearing of the wearable electronic device 200 as the individual fastens the buckling mechanism 213.

In the following, an authentication process (i.e., security check) for authenticating an individual who wears the wearable electronic device 200 is described. The wearable electronic device 200 would identify the individual who wears the wearable electronic device 200 in a biological level for operating the mobile electronic device 100 and loads a corresponding user profile stored in the storage device 205. In detail, upon buckling the buckling mechanism 213, the processor 201 of the wearable electronic device 200 would request the authentication process for identifying the individual who wears the writable electronic device 200. The wearable electronic device 200 may prompt the individual to provide a biometric signature through the biometric reader 205 of the wearable electronic device 200. In the exemplary embodiment, the biometric reader 205 would measure ECG data representing electrical activity of a heart of the individual as the biometric signature unique to the individual. Next, the processor 201 of the wearable electronic device 200 would determine whether the measured biometric signature is consistent with a stored biometric signature stored in the storage device 203 of the wearable electronic device 200. However, the disclosure is not limited thereto. In another exemplary embodiment of the disclosure, the measured biometric signature may be transmitted to the mobile electronic device 100 through the transceiver 209 of the wearable electronic device 200, so that the measured biometric signature may be compared with a stored biometric signature stored in the storage device 103 of the mobile electronic device 100.

After the identity of the individual is verified, the wearable electronic device 200 would be configured as a security key (e.g., a hardware passkey such as a dongle) for operating the mobile electronic device 100 through the BT pairing connection. The individual would be authorized to operate the mobile electronic device based on motion coherence between the mobile electronic device and the wearable electronic device without providing an input. Operations of the mobile electronic device may be performed, automatically, based on the motion coherence between the mobile electronic device and the wearable electronic device.

In one of the exemplary embodiments of the disclosure, the mobile electronic device 100 would be wirelessly connected to the wearable electronic device 200 through the Bluetooth protocol. In other words, the mobile electronic device 100 would be paired with the wearable electronic device 200 with the Bluetooth protocol, and information may be exchanged between the mobile electronic device 100 and the wearable electronic device 200.

In one of the exemplary embodiment, if the buckling mechanism 213 is unbuckled which refers to when the microUSB connector of the buckling mechanism 213 is disconnected, the authentication process would be performed upon reconnection of the microUSB connector. In one of the exemplary embodiments of the disclosure, the wearable electronic device would disable all functions except a clock function, if an individual who wears the wearable electronic device 200 does not pass the authentication process.

Figure 4:
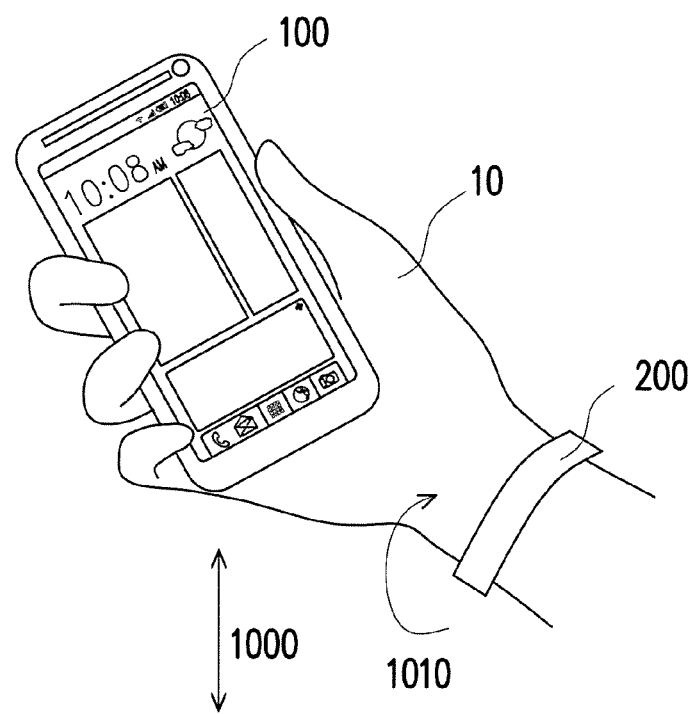
FIG. 4 is a conceptual diagram illustrating the motion coherence between a mobile electronic device and a wearable electronic device according to one of the exemplary embodiment of the disclosure.

FIG. 4 is a conceptual diagram illustrating the motion coherence between the mobile electronic device 100 and the wearable electronic device 200 according to one of the exemplary embodiment of the disclosure. With reference to FIG. 4, the disclosure includes a mobile electronic device 100 and a wearable electronic device 200. In the exemplary embodiment, the wearable electronic device 200 is disposed on an arm 11 of an individual while the individual is holding the mobile electronic device 100 with a hand 10 corresponding to a same limb as the arm 11 wearing the wearable electronic device 200. When the individual moves his limb, a movement would be detected by the mobile electronic device 100 and the wearable electronic device 200, respectively. In response to the movement, the mobile electronic device 100 and the wearable electronic device 200 would each detect a motion data corresponding to the movement. The motion data may be a linear motion data representing a linear movement 1000 or a rotational motion data representing a rotational movement 1010. It should be noted that the linear movement 1000 and the rotational movement 1010 are presented for illustration purpose. The disclosure is not intended to limit the direction of either movement. Then, the motion data obtained from both the mobile electronic device 100 and the writable electronic device 200 may be analyzed (or processed) to determine whether the motions of the mobile electronic device 100 and the wearable electronic device 200 are coherent (i.e., the motion coherence). In the exemplary embodiment, a difference between the motions of the mobile electronic device 100 and the wearable electronic device 200 may be calculated. The mobile electronic device 100 would be considered motion coherent with the wearable electronic device 200 when the difference is within a predetermined threshold. In the exemplary embodiment, when the motion coherence between the mobile electronic device 100 and the wearable electronic device 200 is within the predetermined threshold, the mobile electronic device 100 would be unlocked and operations of the mobile electronic device are authorized.

It should be noted that the wearable electronic device 200 would be able to recognize touch control operations (e.g., sliding or tapping operations) applied on the touch screen 203 of the wearable electronic device 200. For example, the individual may apply sliding touch operations such as rightward, leftward, upward or downward sliding touch operations to the display area to view more information on the display area of the touch screen 203. Tapping touch operation may also be applied to the touch screen 203 to manipulate the wearable electronic device 200. Furthermore, the wearable electronic device 200 would also recognize hand gestures. Since the motion sensor 211 is disposed in the wearable electronic device 200, the wearable electronic device 200 would be able to sense a linear movement, a moving direction corresponding to the linear movement, rotational movements (e.g., tilting hand gestures), etc and interpret the movement as hand gestures for manipulating the wearable electronic device 200.

Figure 5A:
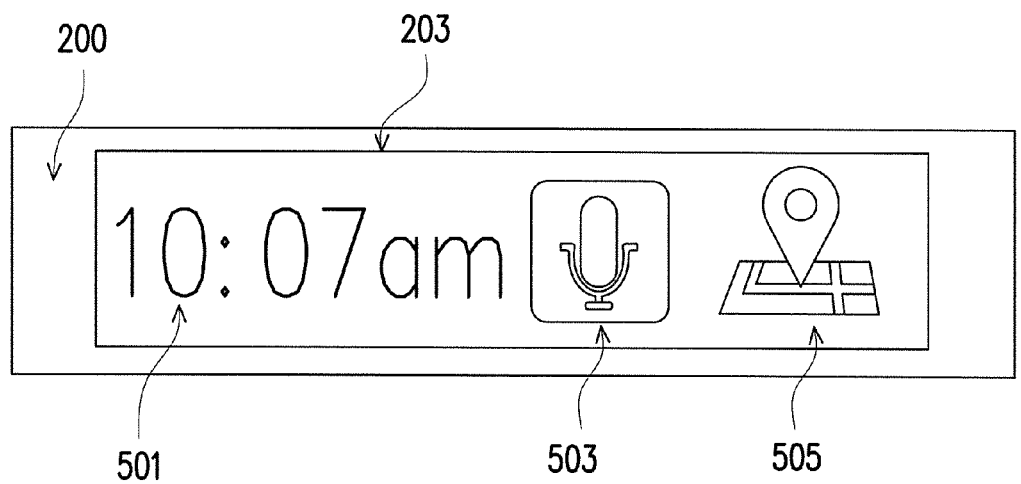
FIGS. 5A and 5B are conceptual diagrams illustrating a touch screen 23 of the wearable electronic device according to one of the exemplary embodiments of the disclosure.
Figure 5B:
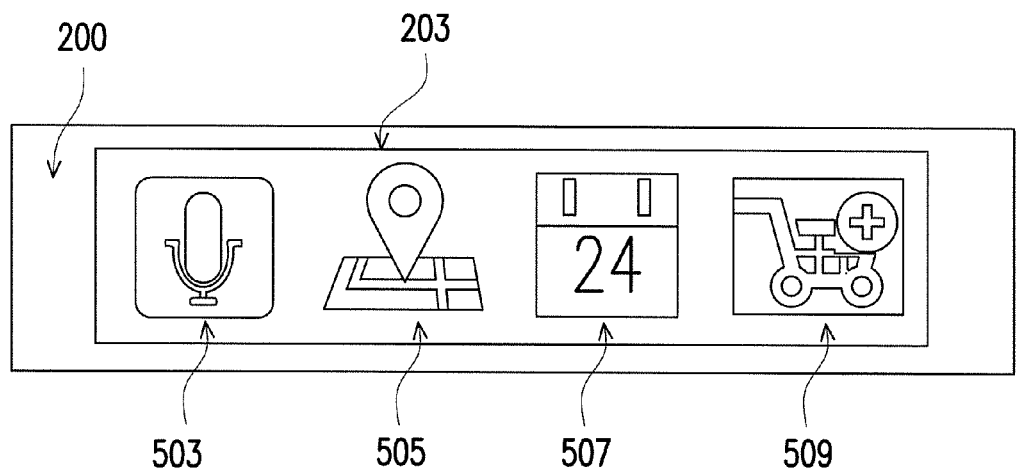

FIGS. 5A and 5B are conceptual diagrams illustrating a touch screen 203 of the wearable electronic device 200 according to one of the exemplary embodiments of the disclosure. With reference to FIG. 5A, a default display of the wearable electronic device 200 is illustrated, which displays a current time and a plurality of icons 503, 505 representing different application programs. In the exemplary embodiment of the disclosure, a touch control operation (e.g., sliding operations) or the hand gestures (e.g., tilting or rotating operations) may be applied to the wearable electronic device 200 to view more icons representing application programs. With reference to FIG. 5B, the individual may apply a leftward sliding operation or the hand gestures (such as rotating leftward) to view more icons 503, 505, 507, 509, 511. Each of the icons 503, 505, 507, 509, 511 displayed on the touch screen 203 of the wearable electronic device 200 is associated with an application program installed on the mobile electronic device 100. The individual may initiate an operation corresponding to each icon by tapping at an area of the touch screen 203 displaying the icon.

Figure 6A:
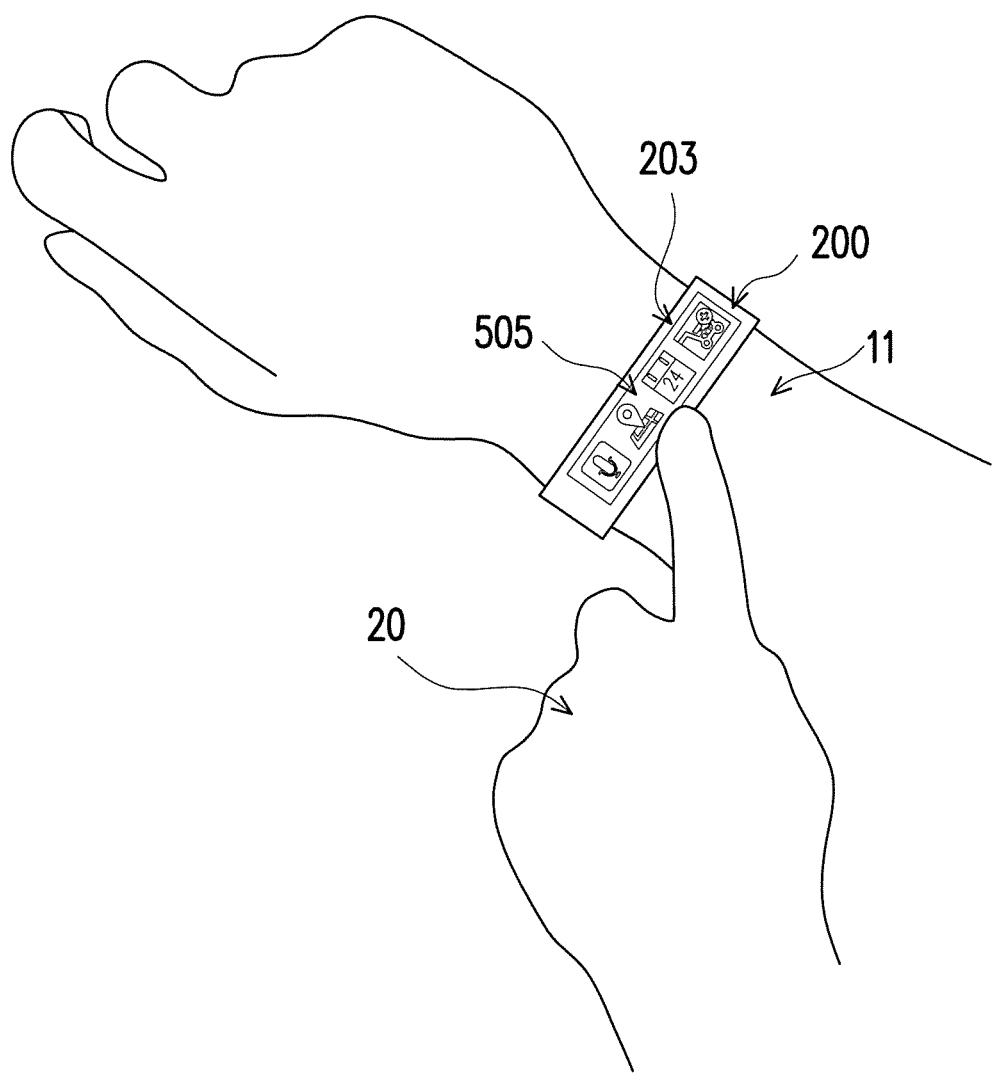
FIGS. 6A and 6B are conceptual diagrams illustrating a method for operating a mobile electronic device illustrated in FIG. 1 with a wearable electronic device illustrated in FIG. 2 according to one of the exemplary embodiments of the disclosure.
Figure 6B:
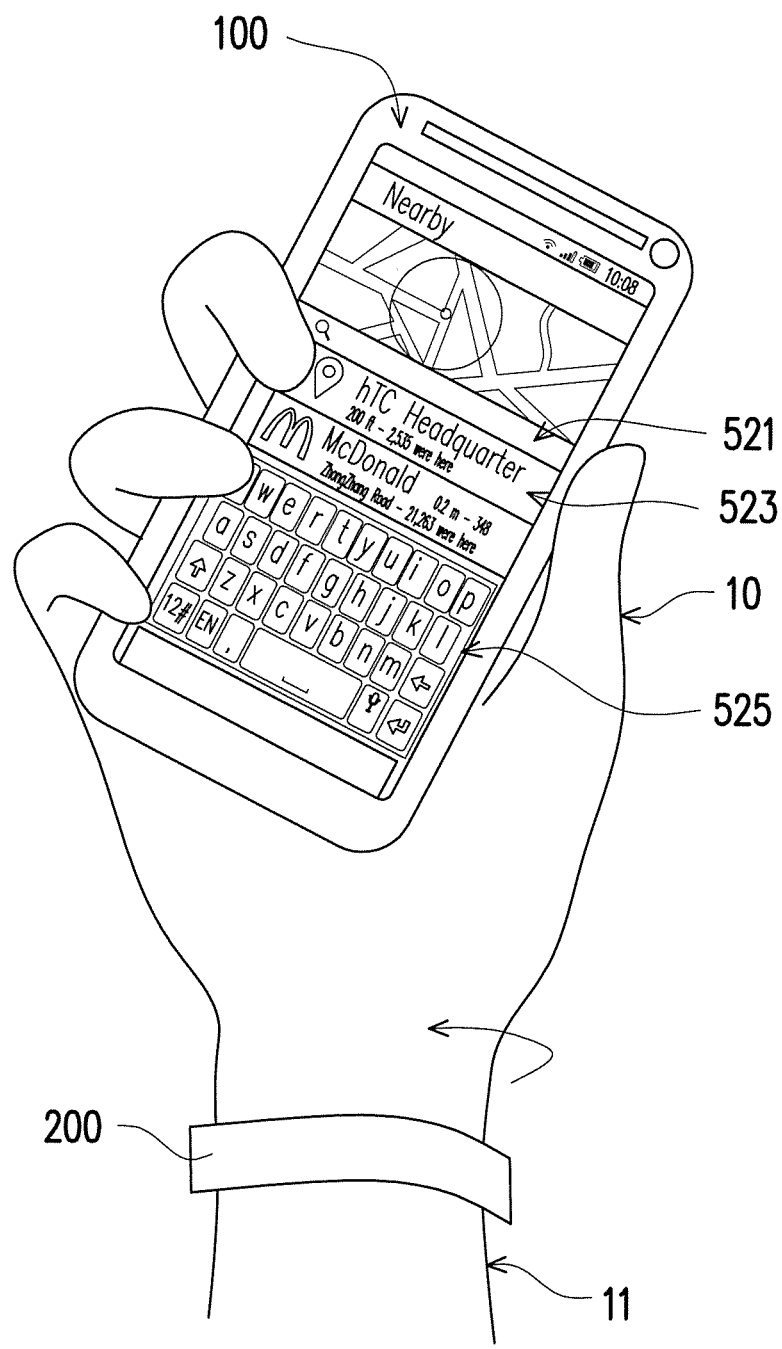

FIGS. 6A and 6B are conceptual diagrams illustrating a method for operating the mobile electronic device 100 illustrated in FIG. 1 with the wearable electronic device 200 illustrated in FIG. 2 according to one of the exemplary embodiments of the disclosure. With reference to 6A, an individual could manipulate the wearable electronic device 200 that is worn on an arm 11 (e.g., right arm) with a left hand 20. In the exemplary embodiment, the individual would select an icon displayed on the display area of the wearable electronic device 200 through an input device (e.g., the touch screen 203, the voice recording device 215, the motion sensor 211) to initiate an application program. In the exemplary embodiment, the input device may be the touch screen 203 (input function of the touch screen 203) of the wearable electronic device 200, and a selection of an icon displayed on the touch screen 203 may be performed by applying a tapping operation at the display area of the touch screen 203 displaying the icon. However, the disclosure is not limited thereto, the input device may also refer to the voice recording device 215 or motion sensor 211. In one of the exemplary embodiments, the selection of an icon displayed on the touch screen 203 may be made through a voice command received from the voice recording device 215 or a hand gesture sensed by the motion sensor 211.

For example, the individual may select the icon 505 to initiate a check-in function of a social networking application program associated with the icon 505. When the check-in function is initiated, the process 201 may obtain a global position system (GPS) coordinate representing a location where the individual is currently located at from a GPS module (not shown) of the wearable electronic device 200. However, the disclosure is not limited thereto. In one of the exemplary embodiment, the wearable electronic device 200 may obtain the GPS coordinate representing the current location of the individual from a GPS module (not shown) of the mobile electronic device 100 through Bluetooth connection. The check-in function would generate a point of interest (POI) list based on the GPS coordinate of the current location of the individual. From the POI list, the individual may select a location and insert commentary regarding the location for sharing his/her thought in the social networking service. Although, the individual may view a plurality of POI listed in the POI list on the touch screen 203. In some cases, the POI list provided by the social networking service might not have a POI which the individual interests. Therefore, the individual may search for or insert a POI. Since the touch screen 203 of the wearable electronic device 200 is small, it would be difficult to insert the commentary or a name of the POI. In either case, the exemplary embodiment would allow the individual to continue the operation initiated at the wearable electronic device 200 on the mobile electronic device 100.

With reference to FIG. 6B, the individual may continue the operation on the mobile electronic device 100 from a stop point where the operation was left off on the wearable electronic device 200 by simply picking up the mobile electronic device 100 with a hand 10 corresponding to a same limb as the arm 11 wearing the wearable electronic device 200. In detail, the processor 101 of the mobile electronic device 100 would first authenticate the use of the mobile electronic device 100 upon pick up. It should be noted that, in the exemplary embodiment, the authentication may be determined based on the motion coherence between mobile electronic device 100 and the wearable electronic device 200. The mobile electronic device 100 would receive an application data from the wearable electronic device 200. The application data may be, but not limited to, information such as a progress of the operation performed on the wearable electronic device 200, an indicator indicating a corresponding application program, GPS coordinate, and so on. The progress of the operation may be a stop point of the operation performed on the wearable electronic device 200. For example, the processor 201 of the wearable electronic device 200 may record the stop point of the operation performed on the wearable electronic device 200. Then, the mobile electronic device 100 would automatically launch an application program corresponding to the operation initiated on the wearable electronic device 200 to continue the operation at the stop point where the operation was left off on the wearable electronic device 200 according to the application data.

For example, after the check-in function is initiated on the wearable electronic device 200, the individual may decide to continue the check-in function on the mobile electronic device 100. The operation of the check-in function may be left off at a selection of a POI, a search or an insertion of a POI, an insertion of the commentary, or any other operations of the check-in function. The processor 201 of the wearable electronic device 200 would record the progress of the operation performed on the wearable electronic device 200, the indicator indicating a corresponding application program, and the GPS coordinate obtained from the GPS module of the wearable electronic device 200 as the application data, and then transmit to the mobile electronic device 100. The application data may be transmitted from the wearable electronic device 200 along with a motion data during the motion coherence of the mobile electronic device 100 and the wearable electronic device 200. It should be noted that the exemplary embodiment is not intended to limit the timing of the transmission of the application data, the application data may be transmitted from the wearable electronic device 200 to the mobile electronic device 100 at any point. Further description would be described with various embodiments of the disclosure later.

After receiving of the application data and the operation of the mobile electronic device 100 is authorized, the mobile electronic device 100 would automatically launch the application program associated with the application data to continue the operation from the point recorded by the application data.

In one of the exemplary embodiment of the disclosure, the individual may decide to continue the selection of the POI on the mobile electronic device 100 after the check-in function is initiated on the wearable electronic device 200. With reference to FIG. 6B, the individual may pick up the mobile electronic device 100 with the hand 10 corresponding to the same limb as the arm 11 wearing the wearable electronic device 200 to continue the operation of the check-in function initiated by the wearable electronic device 200 from the selection of the POI according to the application data. With reference to 6B, the mobile electronic device 100 would automatically launch the application program corresponding to the check-in program and display a POI list 523 according to the application data transmitted from the wearable electronic device 200. So, the individual may select a POI from the POI list 523 displayed on the touch screen 103 of the mobile electronic device 100.

In one of the exemplary embodiment of the disclosure, an insertion of a POI (or commentary insertion) is required during the operation of the check-in function on the wearable electronic device 200. For example, on the wearable electronic device 200, the individual may have an option (e.g., an icon drawn in an addition sign) that would allow the operation to be continued later on the mobile electronic device 100. Once the option is selected, the wearable electronic device 200 would record the current progress of the operation and the associated application program as the application data, and transmit to the mobile electronic device 100. After receiving of the application data and the operation of the mobile electronic device 100 is authorized, the mobile electronic device 100 would automatically launch the application program associated with the application data to continue the operation of the check-in function from a point recorded by the progress of the operation of the application data. For example, with reference to FIG. 6B, the mobile electronic device 100 would automatically launch the application program associated with the check-in function initiated on the wearable electronic device 200. The progress of the operation recorded in the application data would indicated that, on the wearable electronic device 200, the operation of the check-in function stopped at a point where the insertion of a POI (or commentary insertion) is required. So, the mobile electronic device 100 would pick up the operation where the wearable electronic device 200 left off and display a page as illustrated in FIG. 6B, automatically. Furthermore, for the insertion of the POI, the mobile electronic device 100 would place the operation field at a text insertion field 521 for the individual to insert a name of a POI with a virtual input device 525.

As mentioned above, the disclosure does not limit the timing of the transmission of the application data. In one of the exemplary embodiments, the application data may be transmitted from the wearable electronic device 200 to the mobile electronic device 100 after the motion coherence between the wearable electronic device 200 and the mobile electronic device 100 is determined. For example, after the motion coherence (i.e., the mobile electronic device 100 is unlocked), the mobile electronic device 100 would request for the application data from the wearable electronic device 200, so as to continue the operation initiated on the wearable electronic device 200.

In one of the exemplary embodiments, the input button 113 of the mobile electronic device 100 would be utilized for requesting the application data from the wearable electronic device 200. The application data may be transmitted from the wearable electronic device 200 to the mobile electronic device 100 upon a request made with the input button 113 of the wearable electronic device 200 at any time. In one of the embodiments, a request made with the input button 113 would be considered as an authorization for continuing the operation initiated on the wearable electronic device 200. For example, the check-in operation may be continued on the mobile electronic device 100 by pressing the input button 113. Upon the request of the input button 113, the application data may be transmitted from the wearable electronic device 200 to the mobile electronic device 100 so that the check-in operation may be continued on the mobile electronic device 100.

In the disclosure, other functions may be initiated on the wearable electronic device 200 and continued on the mobile electronic device 100. In one of the exemplary embodiments of the disclosure, a purchasing function would be initiated on the wearable electronic device 200. An individual may initiate the purchasing function by selecting an icon 509 (as illustrated in FIG. 5B) displayed on the wearable electronic device 200. When the purchasing function is enabled on the wearable electronic device 200, the individual may add an item to a purchasing list with a radio network identification (RFID) system, a NFC, barcode system (not shown), or any other system utilized for identifying an item. For example, the individual may bring a tag of an item at interest (e.g., cloth or a box of cookie) into a sensing range of the transceiver 209 of the wearable electronic device 200 for the NFC or RFID system to pick up an identification signal of the item at interest. After the identifying the item at interest, the touch screen 203 of the wearable electronic device 200 may display information about the item at interest. Then, the item at interest may be added to the purchasing list through a touch operation or a hand gesture. In the exemplary embodiment, an icon may be provided on the touch screen 203 for the individual to add the item at interest to the purchasing list by one of the touch operations. In other exemplary embodiments voice recognition may be provided for adding the item at interest to the purchasing list. The wearable electronic device 200 would store the purchasing list along with information describing the item in the purchasing list in the storage device 205 of the wearable electronic device 200. It should be noted that, the purchasing list may include one or more items at interest.

When the individual is to check out or to review information regarding the item on the purchasing list, the individual may pick up the mobile electronic device 100 at any time with the hand 10 corresponding to the same limb as the arm 11 wearing the wearable electronic device 200. It should be noted that, in the exemplary embodiment, the purchasing list and information regarding the item in the purchasing list would be transmitted from the wearable electronic device 200 to the mobile electronic device 100 as an application data.

After receiving of the application data and the operation of the mobile electronic device 100 is authorized, the mobile electronic device 100 would automatically launch the application program associated with the application data to continue the operation of the purchasing function. In the exemplary embodiment, the mobile electronic device 100 would automatically launch a purchasing application program and display the purchasing list including item information for the individual to review on the touch screen 103 of the mobile electronic device 100. The individual may modify the purchasing list, such as insert or remove any item to or from the purchasing list on the mobile electronic device 100, and pay for the item in the purchasing list with a payment method stored in the mobile electronic device 100 or wearable electronic device 200. In other words, in the exemplary embodiment, the wearable electronic device 200 would be utilized to create the purchasing list by sensing or scanning an item. After the motion coherence of the mobile electronic device 100 and the wearable electronic device 200, the purchasing list may be transmitted to the mobile electronic device 100 for the individual to continue the purchasing operation such as review or check out at any time.

In one of the exemplary embodiments of the disclosure, the individual may initiate a payment function (e.g., check out) on the wearable electronic device 200. It should be noted that the wearable electronic device 200 is also configured for contact-less payment system at a point of sale (POS) terminal (e.g., credit card) through NFC communication or the likes. That is, the wearable electronic device 200 would store information such as credit cards, debit cards, and the likes for payment. In yet another exemplary embodiment, the wearable electronic device 200 may provide an option of an online payment service (such as Paypal or the likes). For security and identification, the online payment service would require a user ID and a password associated with the user ID. For further protection, in one of the exemplary embodiments, a biometric check may be performed to verify the identity of the individual before enabling the payment service (i.e., credit card payment, online payment, etc.) In the exemplary embodiment, the individual may initiate the online payment service for check out on the wearable electronic device 200. The wearable electronic device 200 would transmit a payment request and any other information (e.g., purchase list) to the mobile electronic device 100. After the individual pick up the mobile electronic device 100 with the hand corresponding to the same limb of the arm wearing the wearable electronic device 200, the mobile electronic device 100 would auto-launch the application program corresponding to the online payment service. For example, a payment application program may be auto launched in which a barcode or a QR code representing the user information may be generated automatically for the merchant to scan.

In yet another exemplary embodiment, instead of generating the barcode or the QR code, the payment application program may automatically enable the image capturing device 107 of the mobile electronic device 100 for capturing (or scanning) a merchant barcode or QR code for obtaining an account information of the merchant. In this way, the individual may continue the online payment function initiated on the wearable electronic device 200 from the mobile electronic device 100. For example, the individual may enter an amount payable to the merchant's account according to the account information obtained from the merchant's barcode or QR code, and then authorize the payment.

In one of the exemplary embodiments of the disclosure, a calendar function may be initiated on the wearable electronic device 200. For example, an individual may initiate a calendar event by selecting the icon 507 illustrated in FIG. 5B as a reminder for inserting descriptions of the event. After the icon 507 corresponding to the calendar function is selected on the wearable electronic device 200, a plurality of scheduled events may be displayed on the touch screen 203. The individual may view through the scheduled events by touch control operations or the hand gestures. At the same time, the insertion of a new calendar event may be inserted by selecting an addition icon or any other touch control operations or the hand gestures. The exemplary embodiment is not intended to limit the disclosure for the type of operations for initiating a new calendar event function on the wearable electronic device 200. In the exemplary embodiment, the application data would include a reminder for inserting a new calendar event on the mobile electronic device 100.

After receiving of the application data and the operation of the mobile electronic device 100 is authorized, the mobile electronic device 100 would automatically launch a calendar application program associated with the application data to continue the insertion of the new calendar event initiated at the wearable electronic device 200.

In one of the exemplary embodiment of the disclosure, a voice message may be recorded on the wearable electronic device 200 as a reminder for inserting a new calendar event. For example, after the insertion of the new calendar event is initiated on the wearable electronic device 200, the individual may record a voice message through the voice recording device 215 of wearable electronic device 200. The application data would further include the voice message corresponding to the insertion of the new calendar event. After the mobile electronic device 100 receives the application data and the operation of the mobile electronic device is authorized, the calendar application program would be launched automatically with an option of playing the voice message.

Figure 7:
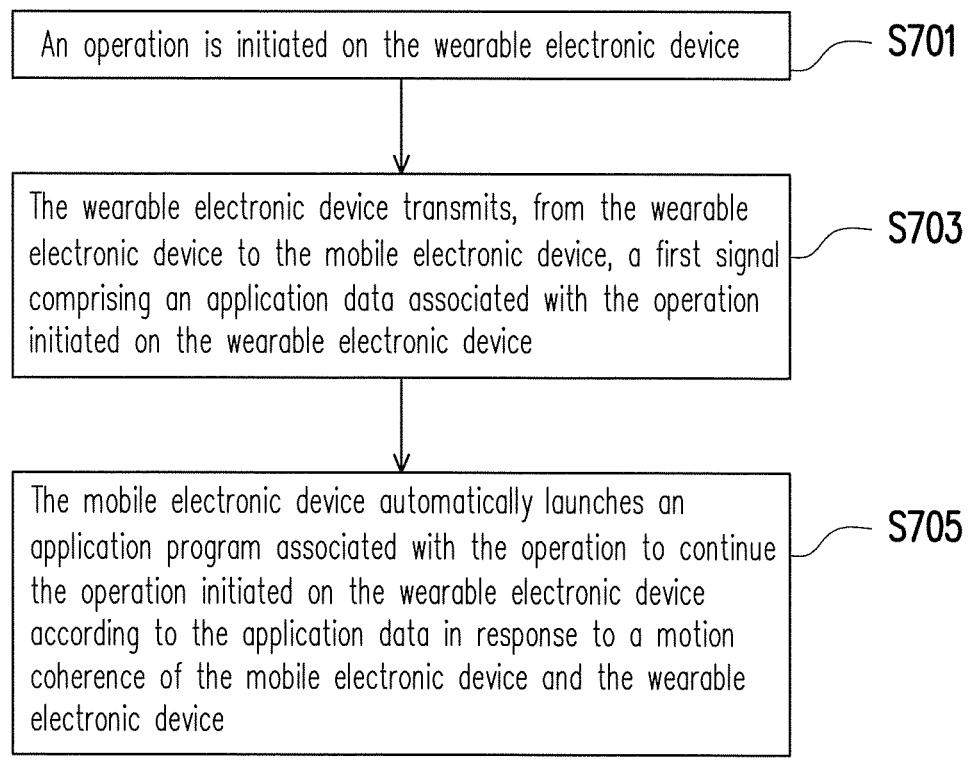
FIG. 7 is a flow diagram illustrating a method of continuing an operation initiated by the wearable electronic device on the mobile electronic device according to one of the exemplary embodiments of the disclosure.

FIG. 7 is a flow diagram illustrating a method of continuing an operation initiated by the wearable electronic device 100 on the mobile electronic device 200 according to one of the exemplary embodiment of the disclosure.

With reference to FIG. 7, in step S701, an operation on is initiated on a wearable electronic device. In step S703, the wearable electronic device would transmit, from the wearable electronic device to the mobile electronic device, an application data associated with the operation initiated on the wearable electronic device. In step S705, the mobile electronic device would automatically launch an application program associated with the operation to continue the operation initiated on the wearable electronic device according to the application data in response to a motion coherence of the mobile electronic device and the wearable electronic device.

In summary, the disclosure provides a method for continuing an operation initiated by a wearable electronic device on a mobile electronic device. In the disclosure, an operation may be initiated by the wearable electronic device. The wearable electronic device would store a progress of the operation and a corresponding application and transmit to the mobile electronic device as an application data. Then, on the mobile electronic device, an application program associated with the operation may be automatically launched, and the operation initiated by the wearable electronic device may be continued from a point where the wearable electronic device left off according to the application data in response to the motion coherence between the mobile electronic device and the wearable electronic device.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method for continuing an operation initiated on a wearable electronic device having a transceiver on a mobile electronic device, comprising:
   initiating an operation on the wearable electronic device;
   transmitting, from the wearable electronic device to the mobile electronic device, an application data associated with the operation initiated on the wearable electronic device, wherein the application data comprises a progress recording a stop point of the operation,
   wherein an application program associated with the operation is automatically launched on the mobile electronic device to continue the operation from the stop point according to the application data in response to a motion coherence of the mobile electronic device and the wearable electronic device,
   wherein the motion coherence between the mobile electronic device and the wearable electronic device is determined by comparing a first motion data of the wearable electronic device and a second motion data of the mobile electronic device.

2. The method of claim 1, wherein the application data comprises the progress of the operation performed on the wearable electronic device and an indicator indicating an application program associated with the operation.

3. The method claim 2, further comprising:
   recording a voice message, the application data further comprising the voice message.

4. The method of claim 1, further comprising:
   displaying an icon, wherein the icons is associated with an application program installed on the mobile electronic device,
   wherein initiating the operation on the wearable electronic device comprises selecting the icons corresponding to the operation to initiate the operation through a touch operation or a hand gesture.

5. The method of claim 1, further comprising:
   detecting the first motion data representing a movement of the wearable electronic device and transmitting the first motion data to the mobile electronic device.

6. The method of claim 1, wherein the application data is transmitted, from the wearable electronic device to the mobile electronic device, after the motion coherence between the mobile electronic device and the wearable electronic device is determined.

7. The method of claim 6, wherein the application data is transmitted, from the wearable electronic device to the mobile electronic device, in response to a request generated by an input button of the mobile electronic device.

8. A wearable electronic device, comprising:
   a transceiver;
   an input device, configured to receive a user input to initiate an operation; and
   a processor, configured to transmit an application data associated with the operation, though the transceiver, to a mobile electronic device, wherein the application data comprises a progress recording a stop point of the operation,
   wherein an application program associated with the operation is automatically launched on a mobile electronic device to continue the operation from the stop point according to the application data in response to a motion coherence of the mobile electronic device and the wearable electronic device,
   wherein the motion coherence between the mobile electronic device and the wearable electronic device is determined by comparing a first motion data of the wearable electronic device to a second motion data of the mobile electronic device.

9. The wearable electronic device of claim 8, wherein the application data comprises the progress of the operation performed on the wearable electronic device and an indicator indicating an application program associated with the operation.

10. The wearable electronic device claim 9, further comprising:
    a voice recording device, configured to record a voice message, the application data further comprising the voice message.

11. The wearable electronic device of claim 8, further comprising:
    a touch screen, configured to display an icon and receive a touch operation, wherein the icons is associated with an application program installed on the mobile electronic device; and
    wherein the processor is further configured to initiate the operation through a touch operation applied on the touch screen or a hand gesture detected by a motion sensor.

12. The wearable electronic device of claim 8, further comprising:
    a motion sensor, configured to detect the first motion data representing a movement of the wearable electronic device, wherein the transceiver is further configured to transmit the first motion data.

13. The wearable electronic device of claim 12, wherein the application data is transmitted, from the wearable electronic device to the mobile electronic device, after the motion coherence between the mobile electronic device and the wearable electronic device is determined.

14. The wearable electronic device of claim 13, wherein the application data is transmitted, from the wearable electronic device to the mobile electronic device, in response to a request generated by an input button of the mobile electronic device.

15. A non-transitory computer readable medium, storing programs to be loaded into an electronic device to perform steps of
    initiating an operation on a wearable electronic device; and
    transmitting, from the wearable electronic device to a mobile electronic device, an application data associated with the operation initiated on the wearable electronic device, wherein the application data comprises a progress recording a stop point of the operation,
    wherein an application program associated with the operation is automatically launched on the mobile electronic device to continue the operation from the stop point according to the application data in response to a motion coherence of the mobile electronic device and the wearable electronic device,
    wherein the motion coherence between the mobile electronic device and the wearable electronic device is determined by comparing a first motion data of the wearable electronic device and a second motion data of the mobile electronic device.

16. A method for continuing an operation on a mobile electronic device having a transceiver, comprising:
    receiving, through a transceiver, an application data associated with an application program installed on the mobile electronic device, wherein the application data comprises a progress recording a stop point of the operation; and automatically launching the application program associated with the application data to continue the operation of the application program from the stop point on the mobile electronic device based on the application data when a difference between a first motion data and a second motion data is within a predetermine threshold.

17. The method of claim 16, wherein the application data comprises the progress of the operation and an indicator indicating an application program associated with the operation.

18. The method of claim 17, wherein automatically launching the application comprises:
opening a page of the application program associated with the progress of the operation stored in the application data; and
continuing the operation from the stop point recorded in the progress of the operation.

19. The method of claim 18, wherein the application data further comprises a voice message corresponding to the operation of the application program.

20. The method of claim 16, further comprising:
detecting the second motion data representing a motion of the mobile electronic device and receiving, through the transceiver, the first motion data.

21. The method of claim 20, wherein the receiving the application data through the transceiver comprises:
transmitting a request signal, through the transceiver, to request the application data after it is determined that the difference between the first motion data and the second motion data is within a predetermine threshold; and
receiving the application data in response to the request signal.

22. The method of claim 21, wherein the request signal is transmitted in response to an input button of the mobile electronic device.

23. A mobile electronic device, comprising:
a transceiver, configured to receive an application data associated with an application program installed on the mobile electronic device, wherein the application data comprises a progress recording a stop point of an operation; and
a processor, configured to automatically launch the application program associated with the application data to continue an operation of the application program from the stop point on the mobile electronic device based on the application data when a difference between a first motion data and a second motion data is within a predetermined threshold.

24. The mobile electronic device of claim 23, wherein the application data comprises the progress of the operation and an indicator indicating an application program associated with the operation.

25. The mobile electronic device of claim 24, wherein the processor is further configured to open a page of the application program associated with the progress of the operation stored in the application data and to continue the operation from the stop point recorded in the progress of the operation.

26. The mobile electronic device of claim 24, wherein the application data further comprises a voice message corresponding to the operation of the application program.

27. The mobile electronic device of claim 23, further comprising:
a motion sensor, configured to detect the second motion data representing a motion of the mobile electronic device, and wherein the transceiver is further configured to receive the first motion data.

28. The mobile electronic device of claim 27, wherein the processor is further configured to compare the first motion data with the second motion data, and wherein the transceiver is further configured to transmit a request signal to request for the application data after it is determined that the difference between the first motion data and the second motion is within the predetermined threshold.

29. The mobile electronic device of claim 28, further comprises an input button, wherein the request signal is transmitted in response to the input button of the mobile electronic device.

30. A non-transitory computer readable medium, storing programs to be loaded into a mobile electronic device to perform steps of:
receiving, through a transceiver, an application data associated with an application program installed on the mobile electronic device, wherein the application data comprises a progress recording a stop point of an operation; and
automatically launching the application program associated with the application data to continue the operation of the application program from the stop point on the mobile electronic device based on the application data when a difference between a first motion data and a second motion data is within a predetermined threshold.

* * * * *